US006847998B1

(12) United States Patent
Arcieri et al.

(10) Patent No.: US 6,847,998 B1
(45) Date of Patent: *Jan. 25, 2005

(54) APPARATUS FOR CONTROL AND CERTIFICATION OF THE DELIVERY OF GOODS

(75) Inventors: Franco Arcieri, Rome (IT); Guido Maria Marinelli, Rome (IT); Maurizio Talamo, Rome (IT)

(73) Assignee: Alasi di Arcieri Franco & C.S.A.S., Rome (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/762,541

(22) PCT Filed: Aug. 11, 1999

(86) PCT No.: PCT/IT99/00263

§ 371 (c)(1),
(2), (4) Date: Apr. 11, 2001

(87) PCT Pub. No.: WO00/10142

PCT Pub. Date: Feb. 24, 2000

(30) Foreign Application Priority Data

Aug. 12, 1998 (IT) ...................................... RM98A0541

(51) Int. Cl.[7] .............................................. H04L 12/26
(52) U.S. Cl. ......................... 709/224; 709/230; 705/26
(58) Field of Search ........................... 705/26; 709/224, 709/225, 223, 229, 230, 236

(56) References Cited

U.S. PATENT DOCUMENTS

| 5,101,402 A | 3/1992 | Chiu et al. ..................... 370/17 |
| 5,602,905 A | 2/1997 | Mettke ......................... 379/96 |
| 5,727,163 A | 3/1998 | Bezos ......................... 395/227 |
| 5,793,954 A | 8/1998 | Baker et al. ............. 395/200.8 |
| 6,587,439 B1 * | 7/2003 | Arcieri et al. .............. 370/252 |

FOREIGN PATENT DOCUMENTS

| EP | 0 595 509 | 5/1994 |
| EP | 0 726 664 | 8/1996 |
| EP | 0 801 479 | 10/1997 |
| WO | 98/36532 | 8/1998 |
| WO | 98/49658 | 11/1998 |

OTHER PUBLICATIONS

Bhat, Sunil, "The Network Advisor Analysis and Real–Time Environment", *Hewlett–Packard Journal*, vol. 43, No. 5, pp. 29–33 (Oct. 1992).

Jander, Mary, "WAN Protocol Analyzers", *Data Communications*, vol. 21, No. 6, pp. 69–81 (Apr. 1992).

Kafka, Gerhard, "Protokollanalysatoren", *Elektronik*, vol. 36, No. 4, pp. 111–117 (Feb. 1987).

Prufer, R.J., "Network Advisor Protocol Analysis: Decodes", *Hewlett–Packard Journal*, vol. 43, No. 5, pp. 34–40 (Oct. 1992).

* cited by examiner

*Primary Examiner*—Charles T. Jordan
*Assistant Examiner*—Susan C. Alimenti
(74) *Attorney, Agent, or Firm*—Ladas & Parry, LLP

(57) ABSTRACT

An apparatus for control and certification of the delivery of goods and for the concurrent control and certification of the execution of the related payment includes a system for reading an electronic card and for managing authorization processes by the electronic card issuing company, an apparatus for monitoring and interpretation of application protocols for network data transmission systems connected to the system for reading an electronic card, and a data storing unit of the various transactions monitored and interpreted by means, of the apparatus for monitoring and interpretation of the application protocols.

10 Claims, 11 Drawing Sheets

APPARATUS FOR CONTROL AND CERTIFICATION OF THE DELIVERY OF GOODS

BACKGROUND

1. Field

The present invention provides an apparatus for control and certification of the delivery of goods in the field of electronic commerce, and for the concurrent control and certification of the execution of the related payment.

2. Description of Related Art

Electronic commerce" not only refers to the purchase of goods delivered "electronically" (e.g., a document), it also refers to electronic orders of goods delivered through non-computerized distribution channels.

A POS (Point of Sale) is a system allowing purchase by means of "electronic money" using a card having a magnetized strip, a microprocessor or both or even the mere identification number, usually 16 digits, of a card (cash card, credit card or others). Such card will be indicated with the generic term of electronic card, for ease of reference.

The POS system includes a plurality of elements, some (A1 to A10) placed on the user side, others (B1 to B5) on the side of the company issuing the electronic card:

A) USER SIDE
1) An electronic card reading device;
2) a data input device (keypad);
3) a display device;
4) a printing device;
5) a modem;
6) software for processing of data read by the reading device (bank or credit company code, client code etc.). Data are stored in a buffer for subsequent comparisons. The company code is used to determine the identification number of a company issuing electronic cards to which one can connect. On the other hand, the client code will be used to operate the related monitoring, once connection to the company issuing the electronic cards is obtained;
7) Input data processing software. The amount entered through the keypad (or directly acquired from a cash register) is also stored in a buffer and later sent to the electronic cards issuing company for the debiting procedure;
8) User-entered data (personal secret code) processing software, including an encrypting module. After a code is entered on a keypad, a module specially provided for the purpose masks the entered digits, replacing them on the display with asterisks, while a further module applies an encrypting algorithm to the entered code. Then the code thus encrypted is stored in a buffer to be sent later on to the company issuing electronic cards for the monitoring procedure;
9) A data transmission software. Usually, a commercial communication software (based on standard TCP/IP protocols or the like) is used, sending the above mentioned stored data to the center modem by means of the modem mentioned at 5); and
10) Data receiving and interpretation software. With reference to the receiving software, a commercial communication software (based on standard TCP/IP protocols or the like) is used. On the other hand, the interpretation software stores the various elements (amount, client code and secret code) in buffers, according to the received data sequence. A decrypting module is also provided.

B) ELECTRONIC CARD ISSUING COMPANY SIDE
1) A telephone calls receiver, typically a device capable of modulating several telephone lines, e.g., an ISDN trunk;
2) A dedicated processor, with related peripheral devices;
3) A database containing information about cardholders, codes, granted credit, thefts/losses and the like;
4) Interrogation and authorization software to end the transaction. In particular, by means of the client code, the database is first of all interrogated to access fields reporting stops, thefts etc. Then the database is interrogated to access fields containing the maximum amount reserved to the holder of the card and the amounts already spent. If everything is in order (card not stolen, expenditure amount not exceeding daily withdrawing limit, sum of amounts already spent and of new amount within the monthly withdrawing limit) then the expense amount operated at that time is added to the monthly and daily expenses fields. After that, the transaction is concluded successfully, by generation of an "OK" code to be forwarded to the remote POS terminal; and
5) Software for forwarding along the telephone line of the caller the above calculated answer. Usually, a commercial communication software is used here as well (based on TCP/IP standard protocols or the like) forwarding the "OK" code to the remote POS terminal that activated the request through the modem.

FIG. 1 shows a flow chart referring to the entire prior art system listed above:

In a first step D1 the operator inserts the card in the reading device.

In a second step D2 the data processing software mentioned at A6 above acquires the information stored in the card (bank or credit company code, client code etc.).

In a subsequent decision step D3, the card is recognized or not recognized.

If the card is recognized, the flow proceeds to the steps D4 and D5, where manual or automatic entering of the amount to be paid and of the secret code are requested, respectively.

In a subsequent decision step D6, the secret code is recognized or not recognized, always by means of the software mentioned at A6 above.

In a subsequent step D7, the acquired information is forwarded to the card issuing company center. The information includes the client code, the amount to be paid, the identification number of the caller and whatever else is needed to be processed at the card issuing company side.

In the subsequent steps the card issuing company center acquires the request, processes it and sends the answer to the caller.

In particular, step D8 verifies whether the data of the provider authorize the transaction or not. If the transaction is authorized, step D9 debits the cost on the provider side. In a subsequent step D10, the affirmative answer is acquired by the caller, while in a further step D11 the slip confirming the transaction conclusion is printed. On the other hand, if the transaction is impossible (step D12), the reason why the transaction cannot be concluded can be printed or displayed.

On the other hand, if the transaction is successfully concluded, the operator delivers the goods (step D13).

A system as the one hereto described, currently adopted by nearly all stores and sales centers, cannot be easily applied to the field of electronic trade, i.e., to the field related to the remote electronic purchasing of items or goods by means of a network connection and on-line payment by electronic card. The intrinsic need of the system to provide for the presence of an operator certifying successful conclusion of a transaction is one of the main reasons why the system is impractical.

The currently known electronic trade systems provide the simple entering of the credit card identification number and the forwarding of the number through Internet, Intranet, Extranet nodes or the like. The problems associated with such mode are well known: on one hand, the unwillingness of the user to let his credit card number travel along a system such as the Internet, not very safe yet, and, on the other hand, the problem for the service provider to make a real time assessment of the validity or not of the credit card number being forwarded. Furthermore, once the provider knows the card number, automatic debiting of a monthly fee after a trial period or other uses by the provider that could hardly be controlled by the client can occur. The client will realize those uses only when checking the statement of account.

Another known mode is that of providing payment by means of prepaid cards (e.g., telephone cards, rechargeable cards, prepaid highway-toll cards etc.). A first problem is the value of those cards, which is necessarily limited. Such cards, being payable to the bearer, entail the same risks of loss or theft of cash. Furthermore, such cards have a value which decreases with time, so that the user will never be certain whether he has an amount which is sufficient for a purchase. Moreover, such cards need to be recharged (or repurchased) so that POS specially provided for the purpose have to be envisaged, the widespread distribution on the territory and availability (working hours) thereof being critical factors. Furthermore, prepaid cards are issued by specific service providers (In Italy: Telecom, TIM, Società Autostrade etc.), thus allowing access to services provided by the issuer only, in absence of specific agreements with other service providers.

However, the present invention will be able to use the present prepaid card payment systems, thus providing the customers with a further possible alternative to make the payment.

SUMMARY

The present invention overcomes the drawbacks of the known art as it makes the POS system described above applicable to electronic commerce systems, further allowing concurrent documentation of the operated transactions, without need of providing an operator.

Moreover, by means of the present invention, data related to the credit card do not pass through Internet nodes, and are instead forwarded through different telephone lines, such as those already in use with the POS system, ensuring in this respect a data safety at least equaling that of the current POS systems.

By means of the present invention, it will no longer be necessary to send identifications (numerical codes) relative to a payment system on the Internet, and it will be possible to fully separate the Internet (or Intranet, Extranet or other communication data networks) applicative transaction step from the "negotiation" step of the payment: such step is run using direct communication channels (telephone lines and ISDN, TAC, GSM and satellite lines, radiofrequency etc.).

The present invention allows certification of the conclusion of the payment process taking place through those lines and communication thereof via Internet to the provider who will provide his service, because the provider will have the certainty of having been paid.

In the following description reference will be made to the D ISDN channel as a direct communication channel for the payment step: such choice is a mere example, as any other available direct communication channels (mobile or household telephones, radio etc.) can be used.

A peculiar case that might occur when this invention is used without having another communication channel available relates to use of the same communication channel used for access to the Internet: in this case, by means of the present invention, it will possible to store the necessary data, disconnect from the Internet, use the communication channel to perform the payment, store the payment data, connect again to the Internet, re-establish the connection with the provider and complete the transaction by providing the data relative to payment. Furthermore, as an alternative to the disconnection from the communication channel, it will be possible to use, for the payment step, the same communication channel used for the Internet connection, made "safe" for the communication using methods known in the art (i.e. "tunneling").

The present invention provides an apparatus for control and certification of the delivery of goods by means of Internet, Intranet, Extranet connections or the like and for the concurrent control and certification of the execution of the related payment, comprising:

a) a system for reading an electronic card and for managing authorization processes by the electronic card issuing company(26, 28, 30, 31);

b) an apparatus (27) for monitoring and interpretation of application protocols for network data transmission systems connected to said system for reading an electronic card and comprising:

b1) a data packets monitoring device (9) at a layer corresponding to the OSI layer 2, said data packets comprising control frames and information frames, wherein the control and information frames contain a header portion and a body portion, said header portion for the distinction between an information frame and a control frame;

b2) a control unit (15) receiving as an input the data coming from the monitoring device (9) and comprising means for the discrimination of the control frames from the information frames;

b3) a dating unit (16) connected to the control unit (15) and associating a monitoring time to the control frames and to the information frames;

b4) a discriminated data storing unit (17) storing the control and the information frames and the monitoring time thereof, bidirectionally connected to the control unit (15);

b5) a predetermined data storing unit (18), bidirectionally connected to the control unit (15), said predetermined data representing possible interpretations of the information frames contained in the discriminated data storing unit (17);

b6) means for comparing, by the control unit (15), said predetermined data stored in the storing unit (18) with the data contained in the body portion of the information frames stored in the discriminated data storing unit (17), thus reconstructing the information frames according to their specific application syntax;

b7) means for ordering, according to the time and kind of communication, the information frames reconstructed according to their specific application syntax, thus reconstructing application sequences occurred between a determined source processor and a determined destination processor; and b8) means for ordering said information frames ordered according to the time and kind of communication also according to a logical criterion, thus reconstructing the logical path of said application sequences occurred between a determined source processor and a determined destination processor, and c) a data storing unit of the various transactions object of electronic commerce monitored and interpreted by means of said apparatus (27) for monitoring and interpretation of application protocols.

Control and analysis of the data contained in the data storing unit allow reconstruction of the actual operation mode of the transactions, thus allowing settlement of possible disputes. When needed, data stored in the storage unit might be encrypted by means of encrypting algorithms. The unit might further be lead-sealed.

Advantageous embodiments of the present invention will be provided in the dependent claims thereof.

The procedure is automated; in fact, the attendance of an operator is not needed. A client who wishes to make a purchase will be capable to complete the entire purchasing process with the sole aid of the apparatus according to the present invention.

The apparatus according to the present invention ensures that the goods are not delivered if the payment is not confirmed, that the goods correspond to the order, and lastly that the amount paid corresponds to the one asked for.

Moreover, the apparatus according to the present invention can document in detail all operated transactions. Thus, certified information is made available, allowing settlement of possible disputes.

Various operation modes of the present invention are listed herebelow:

1) Electronic commerce without a teller: the need of a conventional POS operator is eliminated, since the control of the payment and of the delivery of goods is made possible.

2) Authentication of remote bank transactions: in fact, a known type of electronic commerce provides an electronic interaction between an account holder and his own bank. By means of the present invention, once the client is identified by means of his electronic card, the operated transactions will be confirmed and documented.

The identification of a client holder of an electronic card can be further controlled through remote recognition of a fingerprint or acquisition of an image of the client by means of a camera.

3) Recognition and authentication of operators provided with electronic card, who connect to a service center authenticating their identity, thus authorizing them to operate.

4) Electronic commerce via Intranet, Extranet and Internet. It allows to obtain the following advantages:
a) for the purchaser:
a1) entrusting the card number for payment to a transmission line different from the one used for the Internet connection: card-related data will transit through the central switching systems (fixed lines, mobile lines or satellite lines), but not through the Internet web nodes, or the provider nodes. In this way, the card number is not sent to the service provider, thus avoiding possible undesired debiting;

a2) using the established safety standards of the methods and machinery used by the POS;

a3) obtaining a certification and a documentation of the operated transactions that can be used to settle disputes;

a4) a further control of the trade operated from each single location, in case of local networks connected to geographical networks through a single network processor;

b) for the service provider:

b1) certainty of payment: the transaction is forwarded only after availability is controlled by the card issuing companies. Thus, the problems related to cards which have been stolen, revoked and so on are solved;

b2) obtaining certification and documentation of the operated transactions, to be used to settle disputes.

BRIEF DESCRIPTION OF THE DRAWINGS

The present invention will be illustrated herebelow by referring to a preferred embodiment thereof, explained by way of a non-limiting example. Reference will be made to the figures of the annexed drawings, wherein.

DETAILED DESCRIPTION OF THE INVENTION

Data transmission from a source device to a destination device can occur in different manners. However, to ensure a data exchange having the lowest possible chance of errors, it is necessary to adopt a series of rules or control procedures. Such rules or procedures are known as "communication protocols".

Figure 1:
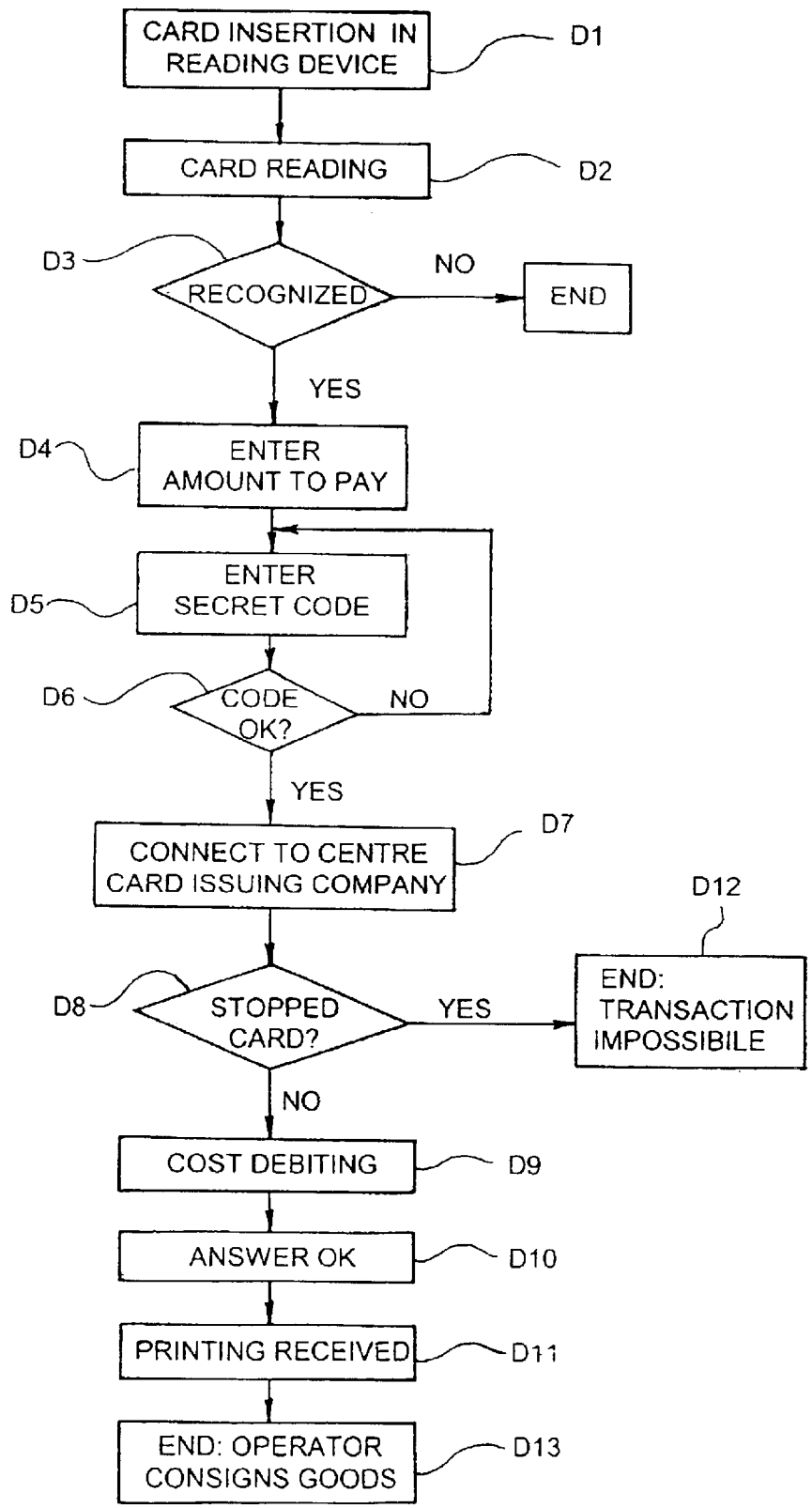
FIG. 1, as set forth above, is a flow chart related to the operation of a POS of the known art.
Figure 2:
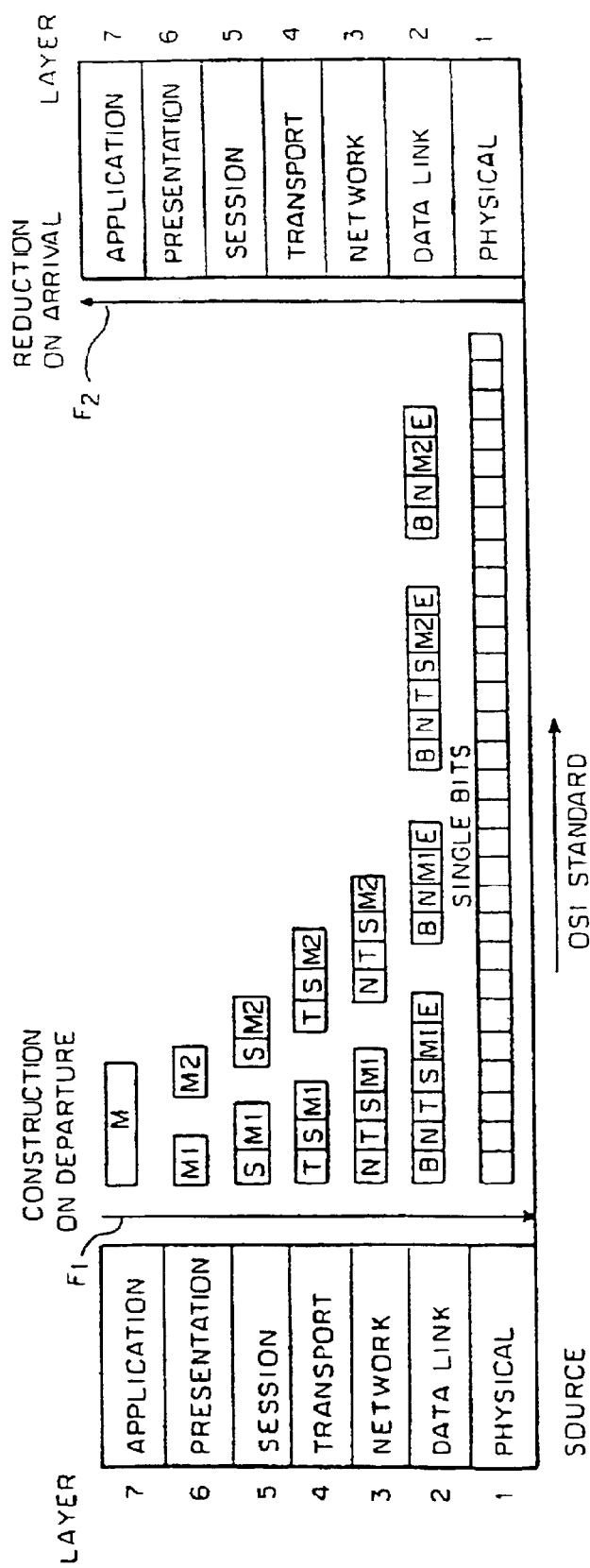
FIG. 2 shows a schematic view of the OSI standard.

FIG. 2 shows a schematic view of the "Open System Interconnection" (OSI) of the International Standards Organization (ISO), a well known communication protocol. Such protocol is divided into seven layers: Layer 7 (application) on the source side contains information only related to the message (M) to be sent to the destination side. The successive layers on the source side add control information to the message: layer 6 (presentation) divides the data of the original message into blocks (M1 and M2); layer 5 (session) adds a title (S) to indicate the sender, the receiver and some information related to the sequence; layer 4 (transport) adds information (T) related to the logic connection between the sender and the receiver; layer 3 (network) adds information related to the path (N) and divides the message into packets representing the standard communication unit in a network; layer 2 (data link) adds a title portion (B) and a tail portion (E) to the message to ensure the correct order of the various packets and to correct transmission errors; the single message bits and control information bits added by the various layers are transmitted on the physical medium through layer 1. The downward pointing arrow F1 on the sender side indicates the manner according to which the outgoing message is constructed. Every addition to the message is verified and removed from the corresponding layer on the destination side. The upward pointing arrow F2 on the destination side indicates the manner according to which the incoming message is reconstructed.

The OSI model schematically described up to this point is just a conceptual model. A typical protocol normally adopted in the transactions related to the electronic trade is the TCP/IP (Transmission Control Protocol and Internet Protocol). Such protocol, just like other communication protocols adopted, can be explained with reference to the layers structure of the OSI model. In each of such protocols, a certain source layer will divide the data it receives from an upper layer adding a header and/or a tail to such data and will forward all this to a lower layer. On the destination side the opposite operations will occur.

Therefore, reference will be made in the following to the conceptual OSI model for ease of reference; it is to be understood that what is described will be easily suitable for every application protocol with obvious modifications, typical of the relation existing between each application protocol and the OSI standard.

Monitoring systems for data transmitted between a sender node and a destination node are already known. However, such systems can only analyze the OSI layers 2 (data link) and 3 (network). The monitoring and the successive interpretation of the data at such layers only allow monitoring of anomalies in the exchange protocol among the various components of a network data transmission system.

Therefore, a typical disadvantage of such prior art systems is their incapability of decoding the application piece of information transported on the network, i.e., the piece of information related to the layers 4 to 7 of the OSI standard.

With reference to the OSI standard, the communication unit in a network is the packet. Packets are in turn divided into frames. The beginning and the end of each frame are usually determined by delimitation characters. The frames are in turn divided into information frames and control frames. The information frames transport the data related to the message that is to be transmitted throughout the network, while the control frames deal with the regulating modes of such transport, i.e., the flow control and the starting of the error recovery actions. Both the information frames and the control frames contain a header portion identifying the frame type and a body portion which is typical of the frame itself.

Figure 3:
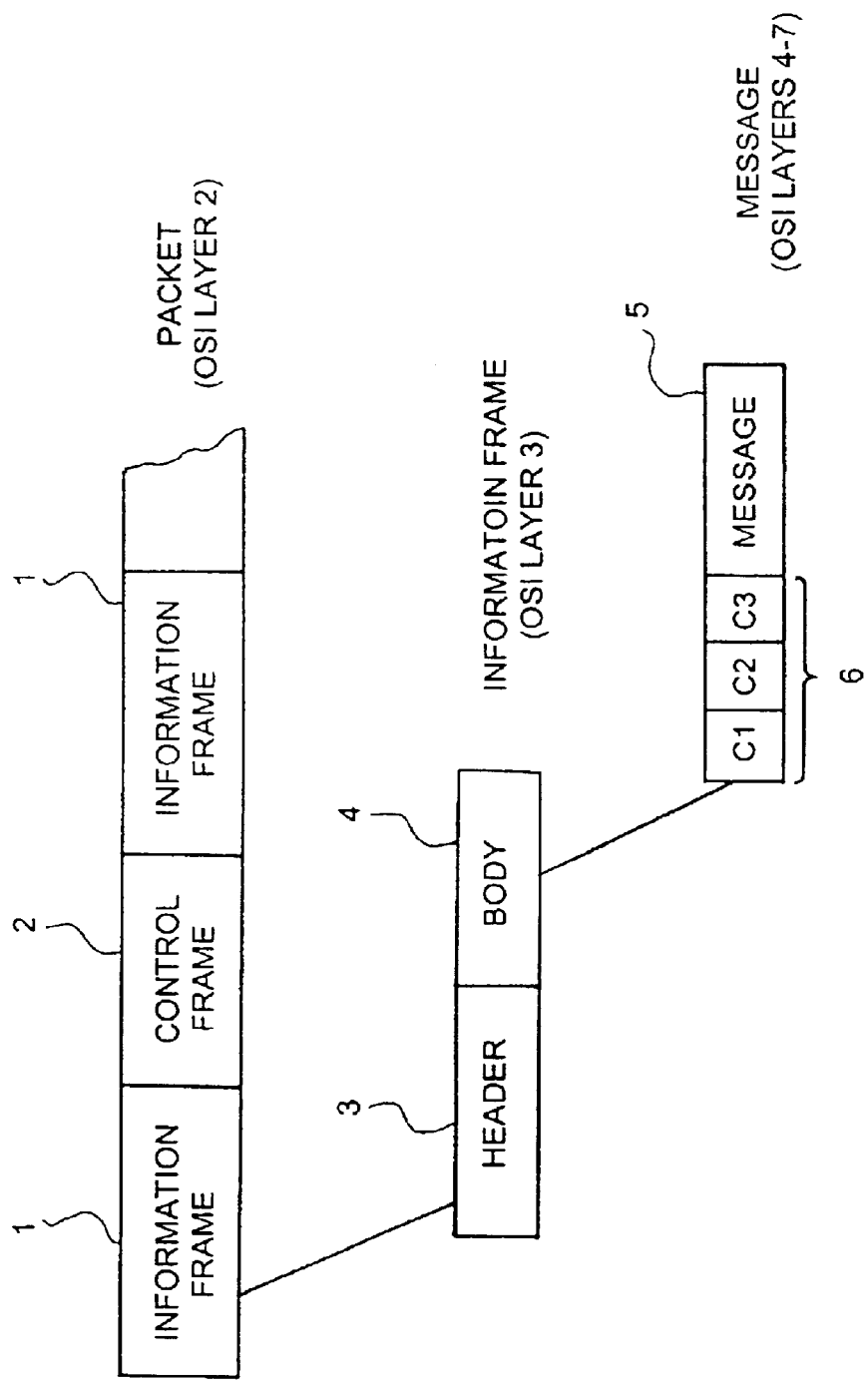
FIG. 3 shows a schematic view of the kind of data used on communication network.

FIG. 3 describes the structure of the information frame. The upper portion of FIG. 3 schematically shows the generic structure of an OSI layer packet 2 which comprises information frames 1 and control frames 2. A single information frame (OSI layer 3) is constituted by a header portion 3, containing the identification that the frame is an information frame, and by a body portion 4. The body portion (OSI layers 4 to 7) contains the real message 5, together with a plurality of fields 6, typical of the particular application syntax used, illustrated by way of example in the figure with the characters C1, C2 and C3. The application syntax is the information relative to the number of fields contained within the plurality 6, to the meaning of each of such fields and to the data contained therein.

Figure 4:
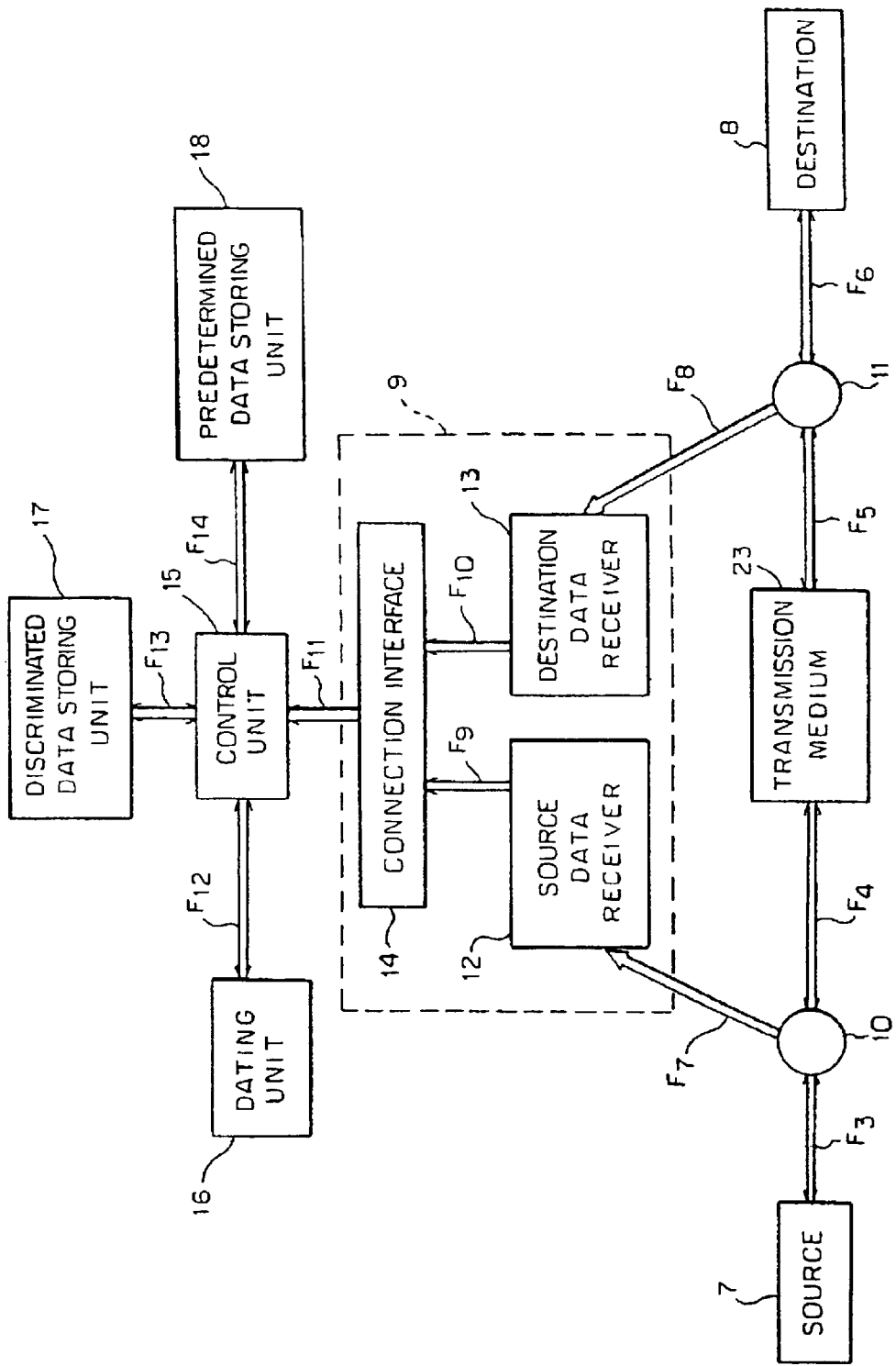
FIG. 4 shows a block diagram of a component of the apparatus according to the present invention.

FIG. 4 shows a block diagram of the component for monitoring and interpretation of application protocols belonging to the apparatus according to the present invention. FIG. 4 shows a source node 7 and a destination node 8, which are the terminals of the network portion in which the data are monitored and interpreted. Throughout the connection between the two nodes, schematically illustrated by arrows F3, F4, F5, F6 and by the transmission medium 23, data relative to plural communications between a first set of source processors (not shown in figure) upstream of the source node 7 and a second set of destination processors (not shown in the figure) downstream of the destination node 8 travel bidirectionally.

Such data are monitored by means of a data monitoring device 9. Several are the monitoring devices known on the market, for instance, with reference to Ethernet networks, the Fast Etherlink XL™ card produced by the company 3Com can be mentioned. With reference to X.25 networks, a possible device is the S508 card produced by the Canadian company Sangoma™. Such card can operate with different OSI layer 1 (physical layer) standards such as, for example, the RS232 (or V.24) standard and the RS422 (or V.35) standard. The OSI layer 2 (data link) standards with which such card can operate are, for example, the HDLC standard and the X.25 standard. In any case, the various data monitoring devices 9 to be chosen for the purposes of the present invention can vary depending on which OSI layers 1 or 2 standards one needs to operate. It is also possible to use monitoring devices working with implementation standards different from the OSI layer 2, such as "Frame Relay" or SDLC or also BSC and the like. Such devices are well known to the person skilled in the art and will not be here described in detail.

Monitoring occurs "transparently" by means of two parallel connectors 10 and 11, schematically illustrated in FIG. 4, for monitoring of the data coming respectively from the source node 7 and from the destination node 8. The monitoring device 9, shown by the dashed block of FIG. 4, includes a source data receiver 12, a destination data receiver 13 and a connection interface 14. The source data receiver 12 allows reception of data coming from the source node 7 only, as schematically indicated with the arrow F7; on the other hand, the destination data receiver 13 allows reception of data coming from the destination node 8 only, as schematically indicated with the arrow F8. The data so received are transmitted to the connection interface 14, as indicated by arrows F9 and F10.

Each data packet situated at a layer corresponding to the OSI layer 2 read by the monitoring unit 9 is forwarded to a control unit 15, as indicated by arrow F11. The operation of the control unit 15 will be described in detail later. A reading time is associated to each of said packets by means of a dating unit 16, represented outside the control unit 15 for ease of description and connected with the control unit 15 as indicated by arrow F12. The dating unit 16 can be any absolute timing device available on the market, in particular a radio or satellite device. In a preferred embodiment of the present invention a radio controlled digital clock adjusted on CET (Central European Time) broadcast by a geostationary satellite was used.

In addition to the association of the reading time by means of the dating unit 16, the control unit 15 orders in a logical way the single frames to reconstruct the right logical and time sequence of the sending of the frames which is known to not always coincide with the reception sequence: in fact, due to the forwarding techniques along telecommunication networks, it is possible for a forwarded "ABC" sequence to be received in all of its possible permutations, i.e., "ABC", "ACB", "BAC", "BCA", "CAB", "CBA". Further, the control unit 15 discriminates the information frames from the control frames. For example, if transmission of the information occurs in the HDLC language, the last bit of the header portion of an information frame is 0 whereas the last bit of the header portion of a control frame is 1. Therefore, inside the control unit 15 there are means, not described in FIG. 4, discriminating such last bit, e.g. a firmware contained in a ROM. In any case no matter which data transmission code is used, it will always be possible to provide means for such discrimination. Therefore, such discrimination allows to store the single information frames deprived of the header portion and comprising the body portion only, thus containing information which is typical of the particular application syntax used, together with the message to be transmitted.

The data incorporating monitoring time and divided into information frames and control frames are stored inside a discriminated data storing unit 17, bidirectionally connected to the control unit 15 as indicated by arrow F13. There is also a predetermined data storing unit 18, bidirectionally connected to the control unit 15. The predetermined data represent possible interpretations of the information or control frames contained in the discriminated data storing unit 17. Their use will be explained with reference to the following figures. The connection between the predetermined data storing unit 18 and the control unit 15 is indicated by arrow F14.

Figure 5:
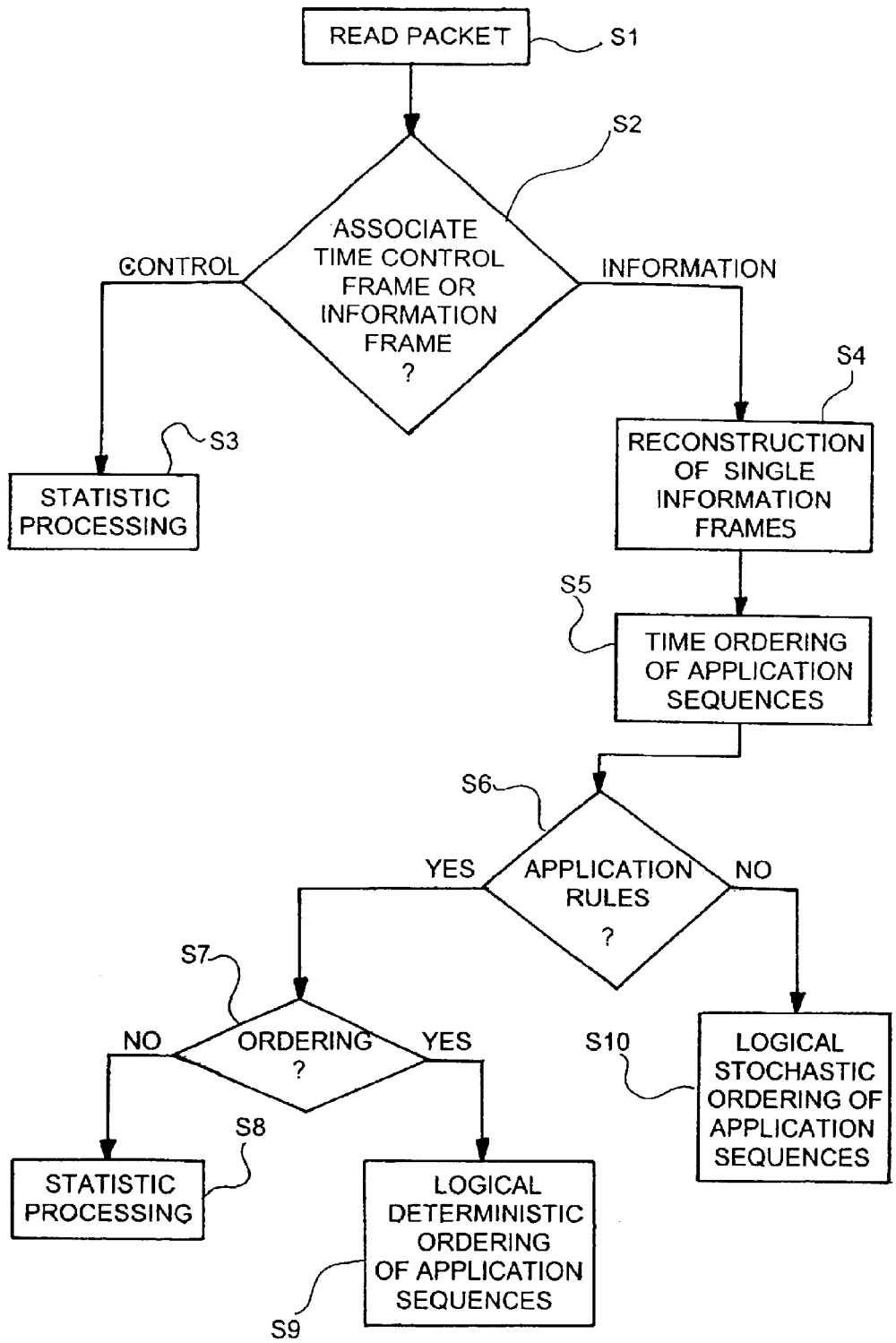
FIG. 5 shows a flow chart explaining the operation of the component in FIG. 4.

FIG. 5 shows a flow chart indicating the operations performed by the control unit 15 on the information frames stored in the data storing unit 17. The access to such information frame can be selectively regulated by means of authorizations and privileges management systems such as passwords, encryption and decryption codes, badge readers and the like given to qualified users.

A first step S1 indicates reading of the various packets by means of the monitoring unit 3. A second step S2 indicates the previously described discrimination, operated by the control unit 15, between the information frames and the control frames, together with the association of the monitoring time.

A statistic processing, shown in step S3, may also be provided on the non-application low layer control frames. The use of the non-application low layer control frames is unimportant for the purposes of the present invention. Such processing is not described in detail at the moment; the mode of operation of such processing will be clear at the end of the present description. The final result of the processing will provide a list of the various control frames, also reporting the number of occurrences for each of said frames.

With reference to the information frames, the flow proceeds to a step S4 wherein the single information frames are reconstructed according to their specific application syntax. For the purposes of such reconstruction, the application syntax structures of the single information frames must be known. Such structures are contained inside the predetermined data storing unit 18 described with reference to the previous FIG. 3. The unit 18 contains, in a text file, for example, a formal abstract description of possible interpretations of the information or control frames. Such data represent the modes according to which the body portion of a single information frame can be structured, for instance the machine transmission code (i.e., related to an information frame forwarded by the source or the destination), the number of the channel (i.e., related to a specific processor upstream of the source node or to a specific processor downstream of the destination node), protocol numbers, data processing numbers etc. said unit 18 can of course contain the syntax of several application protocols, of the information frames that are to be reconstructed in that moment.

A reconstruction of the information frames one by one is obtained by a sequential comparison of the body portion of each information frame with each one of the abstract models in the unit 18.

Further to this, the different application sequences occurred between a determined source processor and a determined destination processor can be reconstructed, i.e., ordered according to time and kind of communication. Throughout the present description, for application sequence the whole of the information frames exchanged between a determined source processor and a determined destination processor during a single communication will be intended. The application sequence ordered in step S5 will contain the single information frames ordered according to a time criterion only and not also according to a logical one. Ordering by time will be possible through the time association occurred in the previous step S2.

In order to further provide a logical ordering of the data inside a specific application sequence, the presence of a group of application rules directing the data exchange between source and destination can be useful, although not necessary. Such application rules, typical of a particular kind of conversation between a determined source processor and a certain destination processor, must be predetermined and as such they are also collected in the predetermined data storing unit 18. The application rules are a series of possible interpretations of the information frames sequences contained in the discriminated data storing unit 17.

Reference will be now made to an electronic purchase of a certificate (personal data, cadastral . . . ), the cost of which is regulated by means of a POS payment. In this case it will be necessary to:

1) Apply with the service provider (FDS), i.e., the body issuing the certificate, in order to obtain the certificate;
2) Acquire the cost of the certificate from FDS;
3) Operate the payment of said cost by means of the POS component;
4) Communicate the executed payment to FDS;
5) Verify the actual transmission of the certificate from FDS to the applicant (certificate validity and authenticity techniques such as "digital signature" can be used);
6) Credit the cost, by means of the POS component, to the bank account of FDS.

In case the apparatus object of the present invention serves several service providers, the POS component could not communicate directly with the bank of the service provider (FDS), but instead with a "service center" to which, with simple modifications of the POS management software, it will forward all amounts and codes of the FDS.

The same "service center" will be in charge of the crediting to the single bank accounts of the various service providers. Thus, all the communications of the apparatuses which are on the territory will be addressable to the same service center. The service center will sum up all the amounts relative to the single providers and credit their bank accounts.

In the present example FDS is assumed to be the only one (e.g., operating by an Intranet). In particular, FDS is assumed to be offering a certificate distribution service by means of a countrywide network of "unattended counters". It will be possible to apply for a certificate at any time, from every counter, even a certificate referring to a territorial zone different from the one where the counter is located, operate the related payment and obtain what was applied for. A counter is represented by any location, located in any one site (public or private) provided with the apparatus of the present invention.

Each one of the above described steps (certificate application, cost acquisition, payment operation . . . ) is realized by means of the exchange between applicant and provider of application flows that are codified in frames. As previously described, the apparatus of the present invention can reconstruct the application sequences.

In the following, the single steps and roles undertaken by the various components are reported.

1) Certificate request
   Applicant: unattended counter.
   Provider: body issuing the certificate The reconstruction of the application flows (sequences) refers to data exchanged between the "applicant" counter from which the certificate application is operated and the "provider" managing the dialogue needed to acquire the information to monitor and issue the certificate.

Furthermore, the apparatus of the present invention stores the reconstructed data. The data for the applicant identification are particularly important.

2) Acquisition of the certificate cost:
   Applicant: unattended counter
   Provider: body issuing the certificate The reconstruction of the application flows (sequences) refers to data exchanged between the "applicant" counter from which the certificate application is operated and the "provider" which, once the certificate is individuated, requests the payment thereof.

The apparatus of the present invention further stores all the reconstructed data. Data referring to the requested amount are particularly important.

3) Payment operation
   Applicant: unattended counter
   Provider: center of the card issuing company The reconstruction of application flows (sequences) refers to data exchanged between the "applicant", counter from which the application for the certificate to be paid was operated, and the "provider" which has to authorize the payment. It is worth to point out that this time the provider is different from the previous cases and that the apparatus forms the interface for the coupling between the authority issuing the certificate and the one authorizing the payment.

The apparatus of the present invention further stores all the reconstructed data. Data referring to the amount authorized by the issuer are particularly important.

4) Communication to the service provider of the executed payment
   Applicant: unattended counter
   Provider: body issuing the certificate The reconstruction of the application flows (sequences) refers to data exchanged between the "applicant", communicating data of the executed payment to the "provider" that, on these bases, is authorized to send the certificate.

The apparatus of the present invention further stores all the reconstructed data.

5) Verification of the actual transmission of the certificate
   Applicant: unattended counter
   Provider: body issuing the certificate The reconstruction of the application flows (sequences) refers to data exchanged between the "provider", sending data related to the certificate and the "applicant" verifying the actual reception.

The apparatus of the present invention further stores all the reconstructed data. Data related to the certificate reception and content are particularly important.

6) Crediting, by means of the POS component, to the bank account of FDS
   Applicant: unattended counter
   Provider: bank (or service center) of FDS The reconstruction of the application flows (sequences) refers to data exchanged between the "applicant", sending data related to the payments related to a determined time interval and the "provider" acquiring the data and acknowledging the reception thereof.

The apparatus object of the present invention further stores all the reconstructed data. Data related to the transmitted amount are particularly important.

Obviously, every step consists of the exchange of different application sequences, each one reconstructed on the basis of suitable rules. In fact, the step of application for a certificate will be divided into entering the certificate type, the holder's data, residence etc. Likewise, the other steps as well shall be divided into various substeps.

An example of the application rules is reported in the following table 1, wherein reference is made to the step of applying for a certificate, substep holder's data entering. The source represents a user (client) applying for a certificate, the receiver (provider) represents the service provider (body qualified to issue the certificate). It is supposed that the conversation is codified by means of the application rules stored inside the predetermined data storing unit 18.

TABLE 1

| 1: AS ? FDS 15 AS ? FDS 5 AS ? FDS 0 |
|---|
| Data of the certificate holder were regularly entered |
| . . . |
| . . . |
| 4: AS ? FDS 13 AS ? FDS 0 |
| Domicile entered by the applicant does not correspond |
| . . . |
| . . . |
| . . . |

Every line of the table is an application rule, i.e. indicating a possible data exchange application sequence between source and destination. The meaning of each application sequence is illustrated herebelow. For example, the first line indicates the following sequence of information frames:
   the source (AS) interrogates (?) the destination;
   the destination (FDS) answers with the activity number 15 codifying, e.g., the request of entering the first name of the certificate holder;
   the source (AS) interrogates again (?) the destination;
   the destination (FDS) answers with the activity number 5 codifying, e.g., the request of entering the surname of the certificate holder;
   the source (AS) interrogates (?) the destination; and
   the destination (FDS) answers with the activity number 0 codifying the sequence completion.

The result obtained at the end of this conversation is that data of the certificate holder have been entered correctly.

The merely exemplifying table 1 could be represented also with a tree structure with more or less branches, according to the number of application sequences provided. Every path up to the leaves of the tree would then represent a particular application sequence, i.e., a particular conversation between source and receiver, i.e., again a particular sequence of information frames between source and receiver.

Any number of application rules can be provided. The larger the number of application rules provided, the bigger the chance to associate each of the application sequences temporally reconstructed in the step S5 with a well defined logical meaning, found by comparison with a particular application rule contained in the predetermined data storing unit 18 in FIG. 3. Therefore, in this manner, it will be possible to verify the correctness or the anomaly of the particular application sequence compared in that moment.

In step S6 of FIG. 5, the control unit 15 first verifies whether such application rules are available or not. Supposing that the application rules are known, the flow can proceed either toward a step S8 or toward a step S9, depending on what was chosen in step S7. The step S8 allows a simple classification of the application sequences. In fact, each application sequence is classified as belonging to a particular path among the various possible paths inside the application rules tree. The step S8 will be explained in greater detail with reference to the following FIG. 6.

On the other hand, in step S9, the logical path of all application sequences monitored by the apparatus in a predetermined time interval is reconstructed. The step S9 will be described in greater detail with reference to the following FIG. 7.

The apparatus according to the present invention allows a reconstruction of the logical path of the application sequences also if a series of application rules is not provided. In this event, the flow proceeds toward a step S10, also described later.

Figure 6:
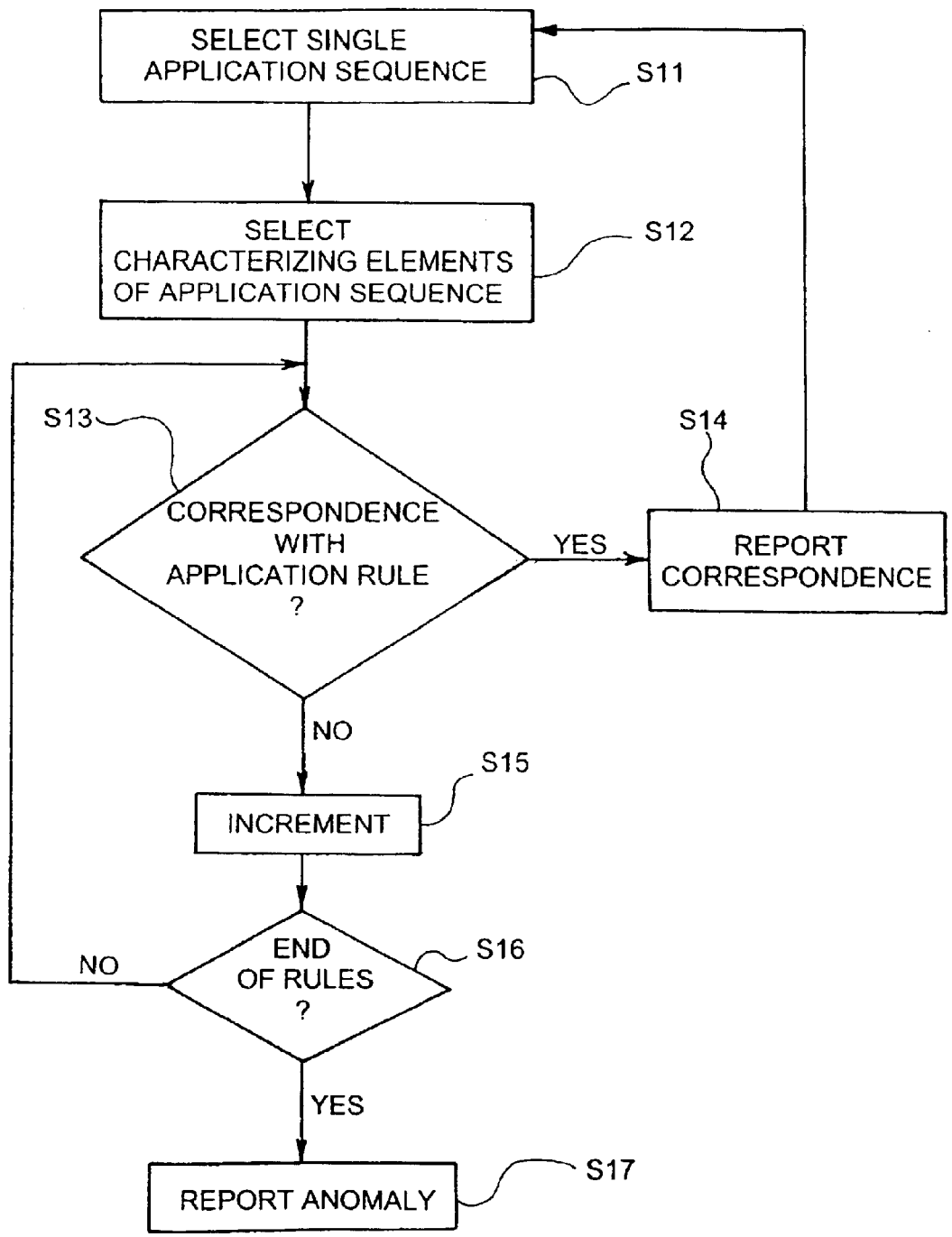
FIGS. 6 and 7 show additional flow charts for the understanding of what described with reference to FIG. 5.

FIG. 6 provides a more detailed explanation of what previously described with reference to step S8 in FIG. 5. In a first step S11, the single application sequence, object of the comparison, is selected. In a successive step S12, the elements which are characterizing for comparison purposes are selected inside the selected application sequence.

In the previously described purchase example with reference to table 1 the characterizing elements might be: the identification number of the source processor, the identification number of the user requiring the purchase operation, the data provided by the source and the data provided by the destination.

In step S13, the characterizing elements of the application sequence at issue are compared with one of the application rules of the above described table 1, in search of a possible correspondence. If such a correspondence is found, the flow proceeds toward a step S14 in which the correspondence is reported and will have to be taken into consideration in the interpretation results. Further, the flow selects another sequence and performs again the step S11. If the correspondence at the step S13 is not found, the control unit 15 goes in step S15 to a subsequent rule, and if (step S16) there are still rules allowing a comparison, the control unit performs once again the comparison of step S13. If no further rules are found, the control unit reports an anomaly in the step S17. Such an anomaly might alternatively mean:

either a kind of sequence which should have not been occurred (a real anomaly); or a kind of sequence not inserted by mistake inside the application rules tree.

In each of said events finding such an anomaly is certainly useful for the certification of the kinds of application sequences occurred in the network portion under examination.

Figure 7:
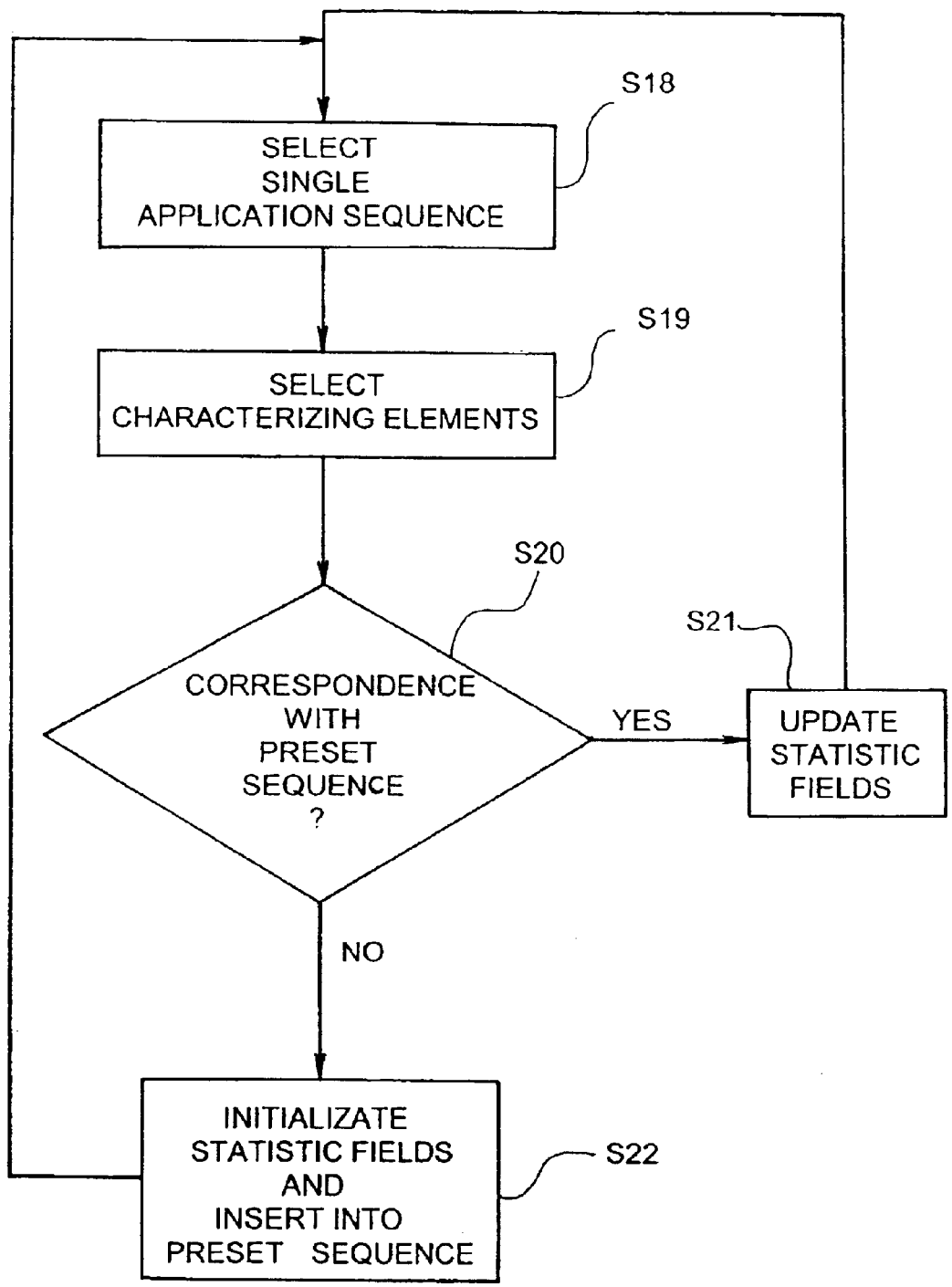

FIG. 7 shows a more detailed explanation of what described in the step S9 in FIG. 5.

The steps S18 and S19 select the single application sequence and the characterizing elements of the same, respectively, similarly to what described with reference to the previous FIG. 6. The step S20 shows the comparison between the application sequence and the preset application rules contained inside the predetermined data storing unit 18. If a correspondence is found, the flow proceeds toward a step S21 wherein the correspondence found is taken into consideration through the update of the related statistic fields. Steps S18–S20 will be subsequently repeated, until the end of the sequences to be classified. If no correspondence is found, the application sequence to be classified is new; and it can be an anomaly or simply an unexpected sequence. In this event the flow proceeds toward a step. S22 wherein the statistic fields related to that specific sequence are initialized. Furthermore, the new sequence will be inserted in the list of the preset sequences to be used for the comparison in the step S20. This is also indicated by the double pointing of the arrow F14 in the previous FIG. 4. Such particular sequences, i.e. the possible anomalies, can be evidenced in a particular manner to be recognized as such. Further to this, also in this case the steps S18–S20 are repeated until the end of the sequences to be classified. In particular, besides the number of crossings for each tree branch, it is also possible to monitor uncrossed branches.

In case there is no preset sequence of application rules, it will always be possible for the control unit to reconstruct the communication applications occurred in the network portion under control (step S9 in FIG. 5). In this event, each analyzed application sequence will not be compared with the preset sequences, and will be compared with the previously analyzed sequences. Therefore, the tree structure containing statistical information will be reconstructed by means of reciprocal comparison of each body portion of the information frames with the others. Also in this case, a tree will be constructed and it will be possible to know the number of crossings for each branch. Obviously, in this case it will not be possible to monitor the uncrossed branches as there will not be a prior knowledge of the existence of the branches.

Figure 8:
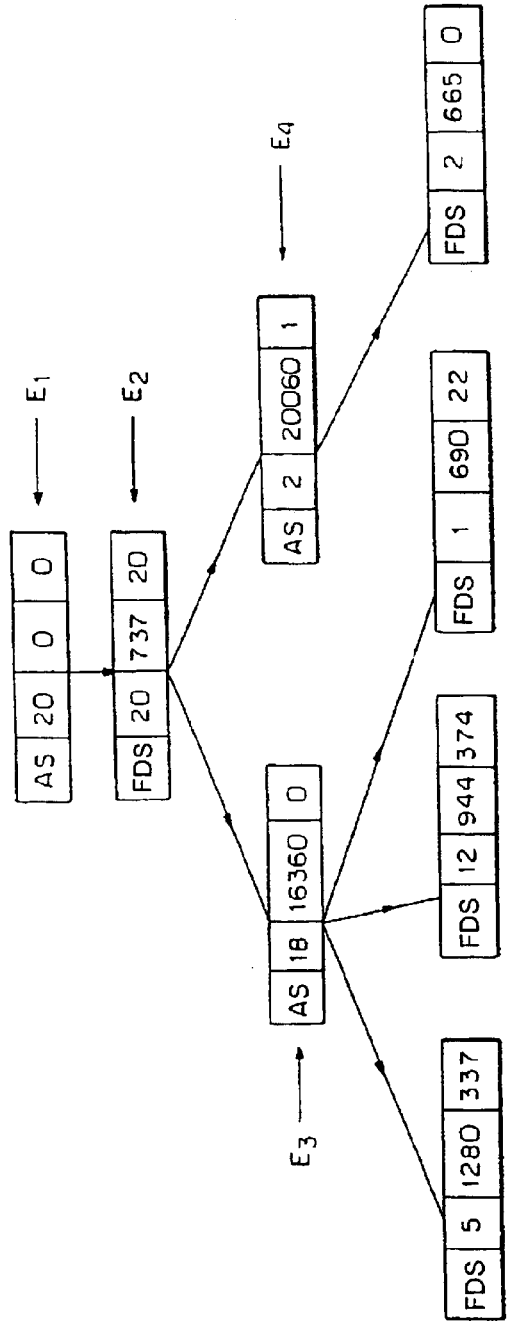
FIGS. 8A and 8B show an example of an application tree containing statistical information obtained by means of the component in FIG. 4.

FIGS. 8A and 8B show an example of an information frame structure and an example of a tree structure containing statistic information obtained by means of the apparatus according to the present invention.

In FIG. 8A it is possible to notice four different fields: a first field 19 indicating the name of the source or destination processor; a second field 20 indicating the number of connections in the monitored time interval, a third field 21 indicating the average time length of each connection, counted for example in milliseconds, and a fourth field 22 indicating the code of the activity executed.

FIG. 8B indicates the reconstructed tree. A first element E1 in the tree indicates that AS (source) connected 20 times, with an average connection time of 0 milliseconds (simple opening of the connection with the destination) and executed the activity with the code 0. A second element E2, E1's only "son", indicates that in all those 20 connections FDS (destination) answered with the activity having the code 20, with an average connection time of 20 milliseconds. There were two manners of proceeding. AS answered 18 times (element E3) with the activity 0 and twice (element E4) with the activity 1. The tree proceeds with other elements, whose meaning is now clarified by the context. The tree herewith disclosed is the result of the logical ordering operated in the step S9 or S10 in FIG. 5.

It is to be noted that the monitoring of the contents in the fields 19 and 22 of each element was operated in the step S4 in FIG. 5. The monitoring of the connections among the various elements, i.e., the fact that the element E2 is E1's "son" and that the elements E3 and E4 are E2's "sons" was operated either in the step S9 or in the step S10 in FIG. 5.

Therefore, the data flow relating to a particular application between one or more determined processors upstream of a source node and one or more determined processors downstream of a destination node can be reconstructed, i.e., univocally determined in all of its component parts. Therefore, the conversation relating to one or more client/provider applications is reconstructed. The logical reconstruction can take the form of the tree structure of FIG. 8B. Thus, communications relating to different applications (which therefore form different application trees) can be reconstructed, and on the same source processor also more client-applications (relating to different provider-applications) can be present. In the same way, on a destination processor more provider applications can be present.

Figure 9:
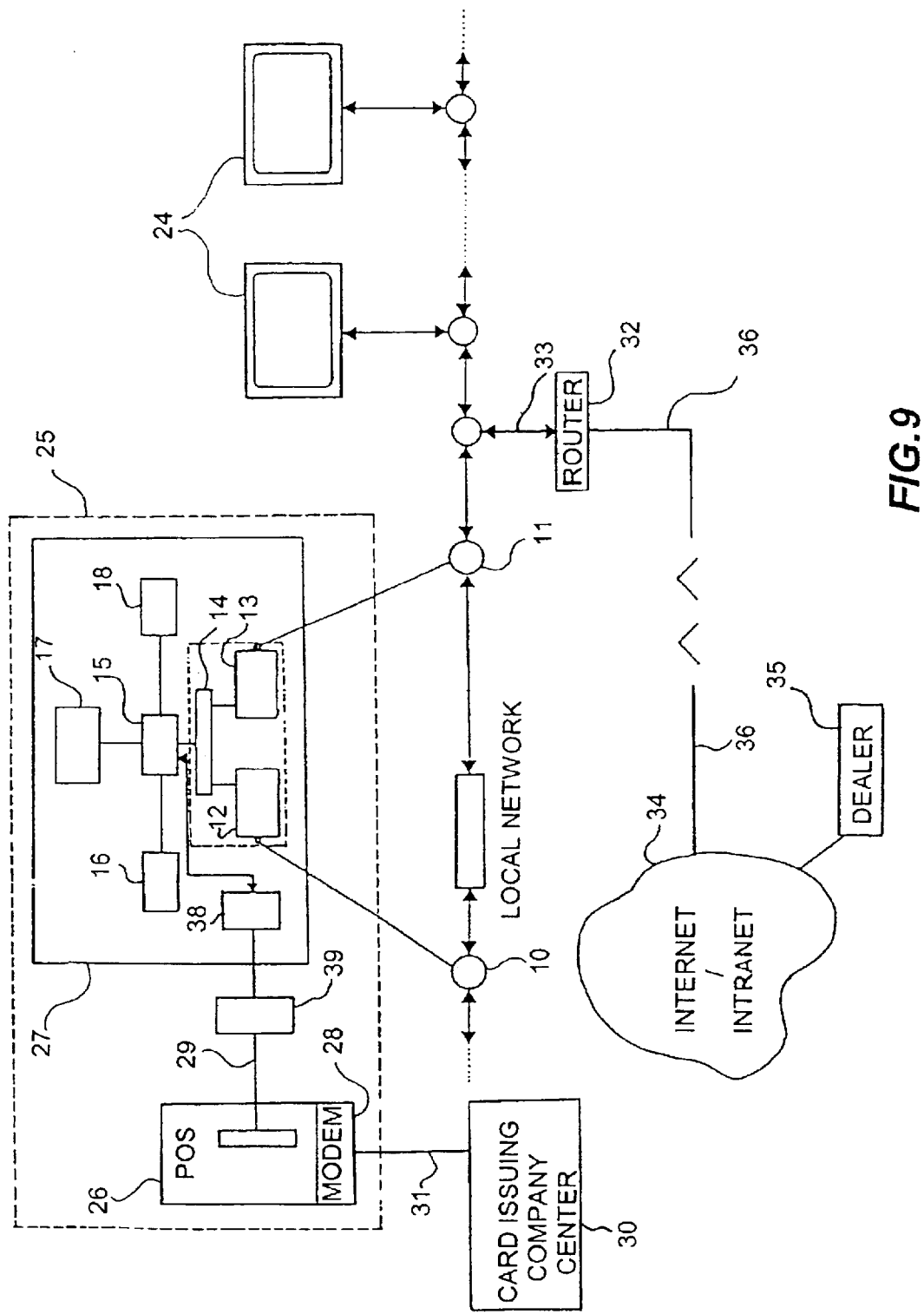
FIG. 9 is a block diagram of the apparatus according to the present invention.

FIG. 9 shows a schematic view of the apparatus according to the present invention. One or more processors 24 are connected in local network to the apparatus 25 according to the present invention, including a POS 26 and an apparatus 27 for monitoring and interpretation of application protocols according to what described with reference to the previous figures from 2 to 8B. In particular, the schematic representation of the apparatus 27 corresponds to the representation thereof shown in FIG. 4. The POS 26 includes a modem 28 and it is connected to the apparatus 27 by means of a local connection 29. In particular, both the POS 26 and the apparatus for monitoring and interpretation 27 comprise respective local network interfaces 37, 38 (as e.g. the Fast Etherlink XL™ card produced by the company 3COM™) coupled therebetween by means of a hub 39. The local network interface 38 of the apparatus 27 is to be understood as connected to the control unit 15 of the apparatus itself. The POS 26 further includes an electronic card reading device, not shown in figure. The modem 28 is in turn connected to the center 30 of the card issuing company by means of a telephone connection 31. The apparatus 27 is connected to the local network, comprising the processors 24, by means of parallel connectors 10, 11 identical to those already described with reference to the previous FIG. 4. The local network of processors 24 is then connected to a router 32 by a connection 33. The task of the router 32 is that of routing the various local networks toward the Internet/Intranet/Extranet network, or toward any remote access to a service provider, schematically represented with 34, and from it to the trader 35. The router 32 will be connected on one side to the local network 24 and on the other side to the geographical network by means of a dedicated interface (telephone, ISDN, CDN dedicated line, optical fibers dedicated line or the like). If the processor 24 is alone (not connected to a local network) then a router is superfluous and the user system can be provided with an internal modem of its own for connection to the geographical network.

Figure 10A:
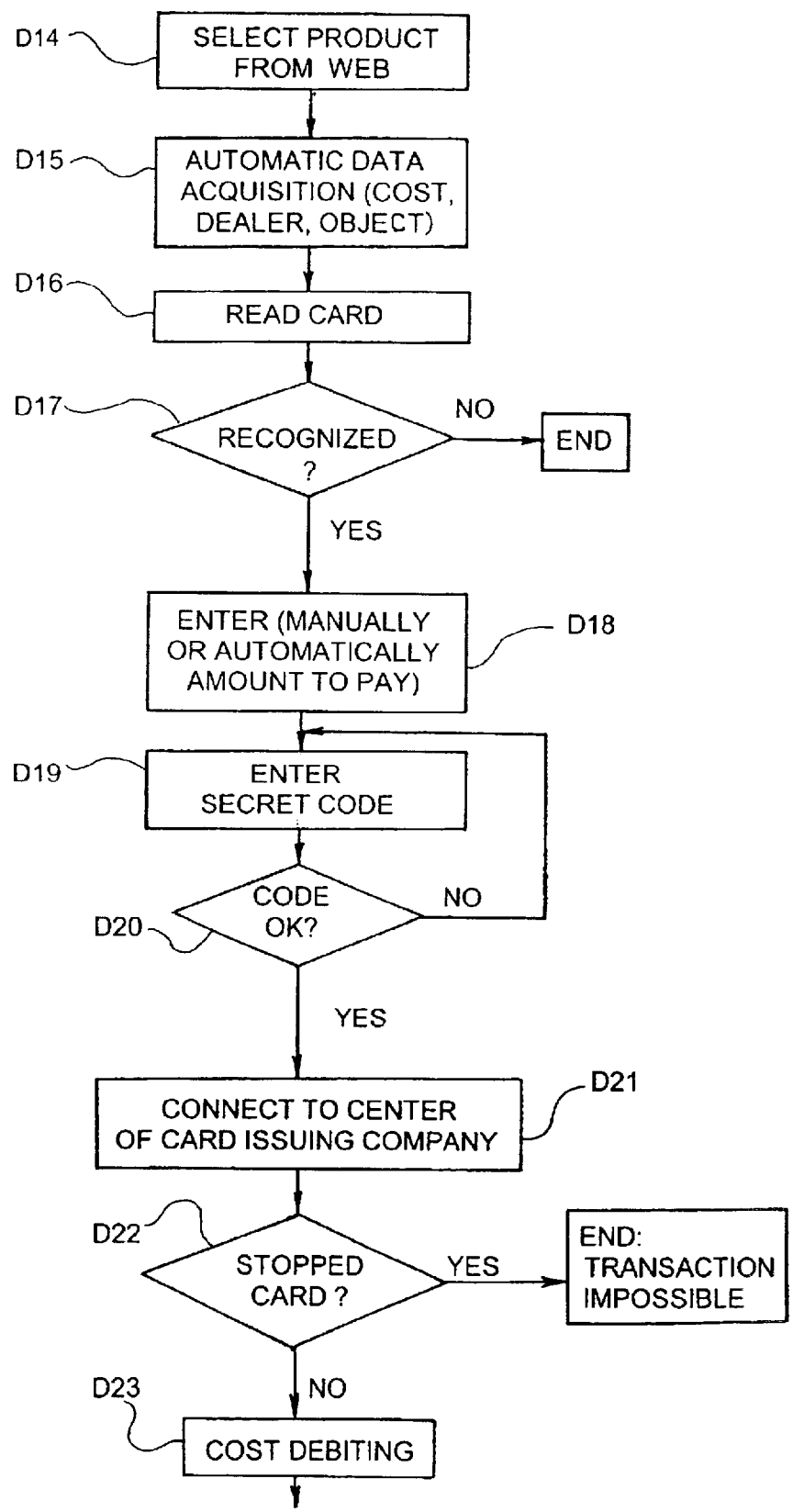
FIGS. 10A and 10B are flow charts related to the operation of the apparatus according to the present invention.
Figure 10B:
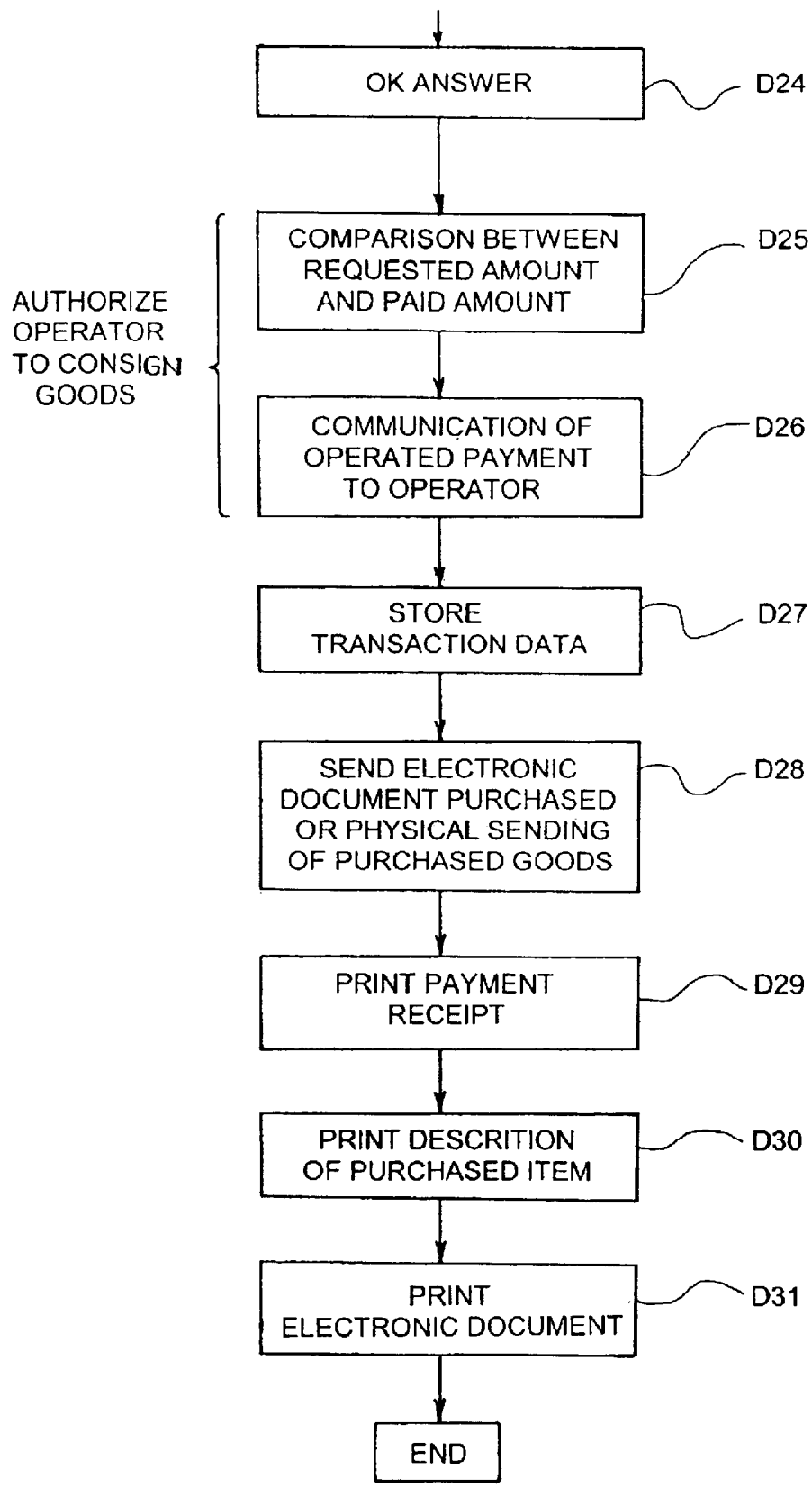

FIGS. 10A and 10B are flow charts which better explain the operation of the system in FIG. 9.

With reference to FIG. 10A, in a step D14 the user selects the product/service of interest from an a web interface or other kind of interface, through the processor 24 connected to the Internet, Intranet, Extranet network or the like.

The processor 24, through which the client makes his choice, can in turn be connected or not to a local network with other processors/devices, as previously represented with reference to FIG. 9.

In a further step D15, the apparatus 25 already shown in FIG. 9 automatically acquires and stores all information related to the requested transaction by means of the component for monitoring and interpretation of the application protocols 27, such as the features of the item to be purchased, the trader, the amount of the requested payment etc. The operation of the automatic acquisition has already been described with reference to the previous figures from 2 to 8B, with reference in particular to the temporal and logical ordering of the monitored data, and the association of a logical meaning to said data using the application rules. Therefore, the answer of the trader to the request of the product/service operated by the client will be reconstructed and data of interest will be individuated among the reconstructed and stored application sequences.

In a subsequent step D16 the user/client inserts his payment card in the reading device in POS 26.

In a subsequent decision step D17 the card is recognized or not.

If the card is recognized the flow proceeds to the steps D18 and D19 wherein the entering (manual or automatic through communication by apparatus 25) of the amount to be paid and of the secret code are requested, respectively. The entering of the amount to be paid (step D18) is also acquired and stored by the component 27 for monitoring and interpretation of the application protocols.

In a subsequent decision step D20 the secret code is recognized or not.

In a subsequent step D21 the acquired information is forwarded to the center of the card issuing company 30 already shown in FIG. 9. The information includes the client code, the amount to be paid, the identification number of the caller and any other data that needs to be processed by the side of the center 30.

It is important to note that the path of information related to the step D21 adopts a communication channel (indicated with 31 in FIG. 9) that can differ from the one (indicated with 36 in FIG. 9) used for the connection to the Internet, Intranet, Extranet or the like. For instance, such a path can occur through the ISDN channel "D", a safe and advantageous solution, already used in known POS systems. Other manners can for example provide a connection of the mobile phone, satellite, on RTG, on a dedicated channel type, or any other technique available now or in the future.

In the subsequent steps the center 30 acquires the request, processes it and sends an answer to the caller.

In particular, in step D22, it is verified whether the data available by the center 30 authorize the transaction or not. If the transaction is authorized, the debiting of the cost on the center side occurs in a step D23.

FIG. 10B shows a further step D24, where the user acquires the affirmative answer.

In a subsequent step D25, also shown in FIG. 10B, a comparison between the requested amount (stored in step D15) and the paid amount occurs. The comparison occurs by means of the component 27 for monitoring and interpretation of the application protocols (FIG. 9) and can concern the comparison between the requested data and those of the product that is about to be received. Thus, an automatic congruency control between the paid amount and the purchased item is ensured.

In the event of a positive comparison, in a subsequent step D26 the communication to the trader 35 (FIG. 9) of the executed payment and therefore the authorization to the trader to consign the goods occurs.

In a subsequent step D27, storing of transaction data in the component 27 occurs. The storing, like the acquisitions and storages hereto described with reference to the component 27, occurs in a sealed local memory on the user side, to be opened for possible controls or disputes. The memory, not shown in FIG. 9, is not described here in detail, as its implementation is obvious for the person skilled in the field.

The purchased product is forwarded in a further step D28. If the product is an electronic document or information obtainable via network, the product is forwarded directly to the processor 24 of the user.

If, instead, the product is to be delivered later on (through usual distribution channels), the provider will have the advantage of having already acquired the payment, and the purchaser will have the advantage of having a system capable of documenting the operated transaction, i.e., a proof of the order, to be used in case of failed delivery.

The subsequent steps D29, D30 and D31 can provide printing of the payment receipt, printing of the description of the purchased item and printing of the possibly requested electronic document, respectively.

From time to time the apparatus of the present invention will forward the credit resulting from the sum of the various purchases operated to the bank of the provider of products/services.

The crediting can occur either to a single trader (e.g. a Ministry, a bank or a local authority) or to more traders, the latter being usual in the electronic trade on the Internet. In case of crediting to various traders, two modes can be provided;

1) A "service center" for all the operated transactions, where the crediting due to each trader is divided (in accordance with what already described)
2) Communicate the transaction data directly to the traders or to their banks, once the OK to the payment and to the sending of the goods is obtained.

The present invention has been up to now described with reference to one of its embodiments, given as a non-limiting example.

Furthermore, it is to be understood that there are other possible embodiments falling within the protective scope of the present industrial property right.

What is claimed is:

1. An apparatus for control and certification of the delivery of goods by means of Internet, Intranet, Extranet connections or the like and for the concurrent control and certification of the execution of the related payment, comprising:
   a) a system for reading an electronic card and for managing authorization processes by the electronic card issuing company;
   b) an apparatus for monitoring and interpretation of application protocols for network data transmission systems connected to said system for reading an electronic card and comprising:
      b1) a data packets monitoring device at a layer corresponding to the OSI layer 2, said data packets comprising control frames and information frames, wherein the control and information frames contain a header portion and a body portion, said header portion for the distinction between an information frame and a control frame;
      b2) a control unit receiving as an input the data coming from the monitoring device and comprising means for the discrimination of the control frames from the information frames;
      b3) a dating unit connected to the control unit and associating a monitoring time to the control frames and to the information frames;
      b4) a discriminated data storing unit storing the control and the information frames and the monitoring time thereof, bidirectionally connected to the control unit;
      b5) a predetermined data storing unit, bidirectionally connected to the control unit, said predetermined data representing possible interpretations of the information frames contained in the discriminated data storing unit;
      b6) means for comparing, by the control unit, said predetermined data stored in the storing unit with the data contained in the body portion of the information frames stored in the discriminated data storing unit, thus reconstructing the information frames according to their specific application syntax;
      b7) means for ordering, according to the time and kind of communication, the information frames reconstructed according to their specific application syntax, thus reconstructing application sequences occurred between a determined source processor and a determined destination processor; and
      b8) means for ordering said information frames ordered according to the time and kind of communication also according to a logical criterion, thus reconstructing the logical path of said application sequences occurred between a determined source processor and a determined destination processor, and
   c) a data storing unit of the various transactions object of electronic commerce monitored and interpreted by means of said apparatus for monitoring and interpretation of application protocols.

2. The apparatus according to claim 1, characterized in that the system for reading an electronic card and for managing authorization processes by the electronic card issuing company comprises a POS terminal connected to the apparatus for monitoring and interpretation of application protocols for network data transmission systems, by means of respective local network interfaces and a hub positioned between said local network interfaces.

3. The apparatus according to claim 1, characterized in that it is connected in local network to one or more processors.

4. The apparatus according to claim 1, characterized in that management of the authorization processes by the electronic card issuing company occurs on a dedicated telephone line.

5. The apparatus according to claim 4, characterized in that said dedicated telephone line is the D ISDN channel.

6. The apparatus according to claim 4, characterized in that said dedicated telephone line is a radiomobile line or a satellite.

7. The apparatus according to claim 1, characterized in that the system for reading an electronic card and for managing authorization processes by the electronic card issuing company communicates, once the transaction is operated, directly with the service provider bank.

8. The apparatus according to claim 1, characterized in that the system for reading an electronic card and for managing authorization processes by the electronic card issuing company communicates, once the transaction is operated, with a service center which in turn sums all the amounts related to various providers and communicates with the respective banks thereof.

9. The apparatus according to claim 1, characterized in that said means for ordering said information frames according to a logical criterion comprise means for reciprocally comparing the body portion of the information frames.

10. The apparatus according to claim 1, characterized in that said means for ordering said information frames according to a logical criterion comprise means for comparing each sequence of body portions of the information frames with a set of predetermined sequences, said predetermined sequences representing possible interpretations of the information frames sequences contained in the discriminated data storing unit, said predetermined sequences being contained in said predetermined data storing unit.

* * * * *